C. F. LOGEMAN.
FISHING LINE SINKER.
APPLICATION FILED SEPT. 13, 1918. RENEWED JULY 15, 1919.
1,322,706. Patented Nov. 25, 1919.
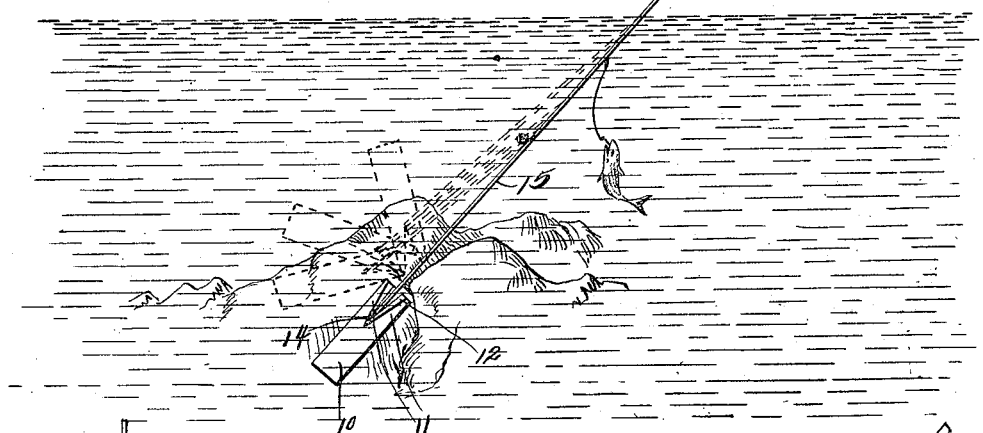
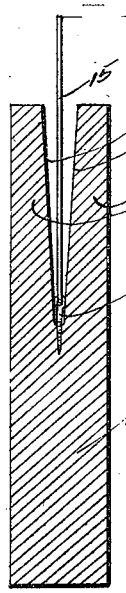
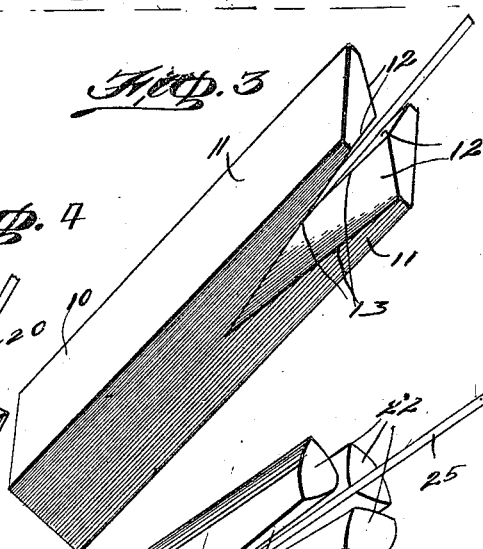
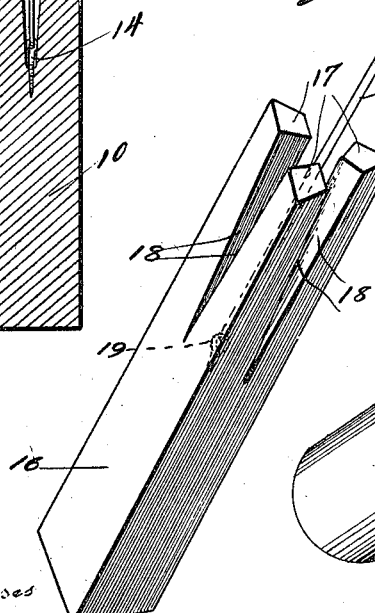
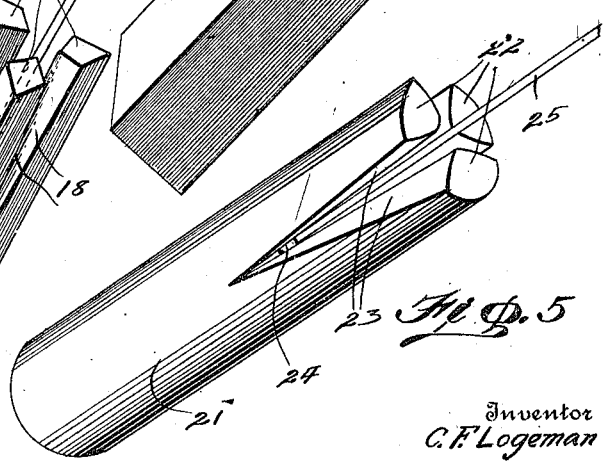
Inventor
C. F. Logeman

UNITED STATES PATENT OFFICE.

CHARLES F. LOGEMAN, OF SOMERSET WEST, CAPE COLONY, SOUTH AFRICA.

FISHING-LINE SINKER.

1,322,706.   Specification of Letters Patent.   Patented Nov. 25, 1919.

Application filed September 13, 1918, Serial No. 253,946. Renewed July 15, 1919. Serial No. 311,108.

*To all whom it may concern:*

Be it known that I, CHARLES F. LOGEMAN, a subject of the King of Great Britain, residing at Somerset West, in Cape Colony, South Africa, have invented certain new and useful Improvements in Fishing-Line Sinkers; and I do hereby declare the following to be a full, clear, and exact description of the invention, such as will enable others skilled in the art to which it appertains to make and use the same.

This invention is an improvement in fishing tackle and has particular reference to a sinker for fishing lines.

It often times occurs in fishing, that in casting and pulling in lines, the sinkers become wedged in rocks or "strike snags" and in endeavoring to disengage the sinkers the lines are sometimes broken with a consequent loss of a portion of the line together with the hooks and sinkers.

The present invention is designed to overcome this objection to the extent of minimizing the danger of such loss, as noted above, and, to this end, a novel sinker is provided and has the line attached thereto in such manner that should the sinker become caught, a pull upon the line will swing the sinker about the caught portion thereof as a pivot and thus free the same from engagement with the "snag."

It is further proposed to provide a sinker of this character which is simple in construction, easily and cheaply manufactured and which will be effective in carrying out the purpose for which it is designed.

The inventive idea involved is capable of receiving a variety of mechanical expressions some of which, for the purpose of illustrating the invention, are shown with the accompanying drawing, wherein:—

Figure 1 is a side elevation of a sinker constructed in accordance with the invention and showing the application thereof, the dotted line positions indicating the successive movements as the same is being detached from an object or obstruction.

Fig. 2 is an enlarged longitudinal section through the form of sinker shown in Fig. 1.

Figs. 3, 4, and 5 are perspective views of different forms of the invention.

Referring to the drawing and more particularly to the Figs. 1, 2, and 3, there is illustrated therein one of the forms of the invention wherein the sinker is formed of a body portion 10 made of lead or any other desirable material and preferably of rectangular formation in cross section. One end of the body is split longitudinally or bifurcated to provide the longitudinally extending and spaced prongs 11 the outer surfaces of which are disposed in the same plane with and form continuations of the adjacent surface of the body. The inner face of each prong 11 is cut to provide surfaces 12 disposed in angular relation whereby the prong will have its greatest thickness in a plane which extends longitudinally through the central portion thereof. The edges 13 which bound the surfaces 12 are disposed in outwardly diverging relation with respect to the edges of the opposite prong and thus provide a space between said prongs which is of gradually increasing width from its inner to its outer end. Secured in the body 10 at a point adjacent the intersection of the inner surfaces 12 of the prongs and intermediate the outer longitudinal edges 13 thereof, is a screw eye or other suitable fastener 14 the longitudinal axis of which preferably extends longitudinally of the body 10. This fastener 14 is adapted to have one end of a fishing line 15 secured thereto in the usual manner so that normally a portion of the line will extend between the prongs 11 and in substantial alinement with the longitudinal axis of the body 10. The line will assume this position especially when pulling the same in after a cast but should the end of either of the prongs 11 strike an obstruction, such as a rock, a further pull upon the line 15 will impart a swinging movement to the body 10 with the end of the prong 11 engaging said obstruction as a pivot. This swinging movement will throw the line 15 out of its substantial alinement with the longitudinal axis of the body and from between the inner adjacent surfaces of the prongs as will be apparent from an inspection of Fig. 1. The dotted lines in said figure indicate the various successive positions that the body 10 will assume and it will be seen that, at some time during the arc of movement of the body, the direction of pull upon the line 15 will eventually disengage the sinker from the obstruction and thereby avoid the possibility of loss of tackle.

In the form of sinker shown in Fig. 4, the body 16 is preferably of triangular formation in cross section and is split at one end to provide a plurality of prongs 17, numbering three in this instance, and the surfaces of said prongs merge into the body 16 with their outer surfaces in the same plane therewith. The prongs 17 are preferably of substantially rectangular formation and the surfaces 18 of each prong are disposed in outwardly diverging relation to the next adjacent surfaces of the opposed prongs. At the intersection of the inner ends of the prongs 17, a fastener 19 similar to the fastener 14, is secured in the body in alinement with its longitudinal axis and is adapted to have fastened thereto one end of the fishing line 20.

A still further form of sinker is disclosed in Fig. 5 wherein the body 21 is of circular formation and split longitudinally at one end to provide the prongs 22 which have their inner adjacent surfaces 23 disposed in outwardly diverging relation so as to provide spaces between the prongs the surfaces of which are preferably curved, as indicated. A fastener 24, similar to those previously described, is secured at the inner ends of the prongs in the same manner as above set forth and is also adapted to have the fishing line 25 connected thereto. From the substantial similarity of construction between the forms shown in Figs. 4 and 5 and that in Fig. 3, it will be apparent that should the sinker in either of the former constructions engage an object, the same action as previously described will take place.

From the foregoing description taken in connection with the accompanying drawing, it will be obvious that the invention provides a simple and inexpensive sinker for fishing lines which will effectively reduce to a minimum the danger of losing portions of tackle when the sinkers are caught by obstructions.

What is claimed is:

1. A sinker for fishing lines comprising a body having one end thereof split to provide spaced prongs and means at the inner end thereof for securing a fishing line thereto.

2. A sinker for fishing lines comprising a body split to provide spaced prongs which extend longitudinally of the body and between which a fishing line is adapted to pass, and means at the inner end of said prongs to which the line is adapted to be secured.

3. A sinker for fishing lines comprising a body split to provide spaced prongs which extend longitudinally and emerge into the remaining portion thereof approximately at a point intermediate its ends.

4. A sinker for fishing lines comprising a body provided at one end with a plurality of prongs the adjacent sides of which are spaced and diverge outwardly to provide slots between which the fishing line is adapted to extend, and means for securing said line at the inner end of said prongs.

5. A sinker for fishing lines comprising a body provided at one end with a plurality of prongs the mutually adjacent side faces of which are spaced and diverge in the general direction of their free ends to provide slots between which the fishing line is adapted to extend, and means positioned between the inner ends of the prongs for securing the fishing line thereto.

6. A sinker for fishing lines comprising a body having one end thereof split to provide spaced prongs having angular surfaces, the prongs extending longitudinally of the body and having their outer surfaces in the same plane therewith, and means at the inner end of said prongs in alinement with the longitudinal axis of the body for attaching a fishing line thereto.

In testimony whereof, I affix my signature in the presence of two witnesses.

CHARLES F. LOGEMAN.

Witnesses:
C. W. REID,
ROMAINE W. MYERS.